United States Patent
Daggett

(10) Patent No.: US 7,966,830 B2
(45) Date of Patent: Jun. 28, 2011

(54) FUEL CELL/COMBUSTOR SYSTEMS AND METHODS FOR AIRCRAFT AND OTHER APPLICATIONS

(75) Inventor: David L. Daggett, Snohomish, WA (US)

(73) Assignee: The Boeing Company, Chicago, IL (US)

( * ) Notice: Subject to any disclaimer, the term of this patent is extended or adjusted under 35 U.S.C. 154(b) by 1596 days.

(21) Appl. No.: 11/480,193

(22) Filed: Jun. 29, 2006

(65) Prior Publication Data
US 2008/0001038 A1    Jan. 3, 2008

(51) Int. Cl.
*F02C 6/18* (2006.01)
(52) U.S. Cl. .................................................. 60/780
(58) Field of Classification Search .............. 60/39.12, 60/226.1, 746, 747, 780, 784, 801, 804; 429/19, 429/20, 17
See application file for complete search history.

(56) References Cited

U.S. PATENT DOCUMENTS

| | | | |
|---|---|---|---|
| 4,729,931 A | 3/1988 | Grimble | |
| 4,845,940 A | 7/1989 | Beer | |
| 5,047,299 A | 9/1991 | Shockling | |
| 5,158,837 A | 10/1992 | Misawa et al. | |
| 5,197,278 A * | 3/1993 | Sabla et al. | 60/773 |
| 5,413,879 A * | 5/1995 | Domeracki et al. | 429/434 |
| 5,968,680 A * | 10/1999 | Wolfe et al. | 429/425 |
| 6,255,010 B1 | 7/2001 | George et al. | |
| 6,365,290 B1 | 4/2002 | Ghezel-Ayagh et al. | |
| 6,450,447 B1 | 9/2002 | Konrad et al. | |
| 6,474,070 B1 * | 11/2002 | Danis et al. | 60/739 |
| 6,606,850 B2 * | 8/2003 | Logvinov et al. | 60/39.6 |
| 6,641,084 B1 | 11/2003 | Huber et al. | |
| 6,834,831 B2 * | 12/2004 | Daggett | 244/58 |
| 6,844,100 B2 * | 1/2005 | Bourgeois et al. | 429/435 |
| 7,025,875 B2 * | 4/2006 | Grieve et al. | 208/208 R |
| 7,114,337 B2 * | 10/2006 | Cazalens et al. | 60/737 |
| 7,150,143 B2 * | 12/2006 | Schick et al. | 60/39.38 |
| 7,235,217 B2 * | 6/2007 | Nguyen | 422/198 |
| 7,278,256 B2 * | 10/2007 | Norris et al. | 60/204 |
| 7,380,749 B2 * | 6/2008 | Fucke et al. | 244/58 |
| 7,549,291 B2 * | 6/2009 | Wollenweber et al. | 60/772 |
| 7,550,218 B2 * | 6/2009 | Hoffjann et al. | 429/440 |
| 2003/0012997 A1 | 1/2003 | Hsu | |

OTHER PUBLICATIONS

Stefanopoulou, A. "Control of Fuel Processor for Hydrogen Generation in Fuel Cell Applications," Controls for Fuel Cells Workshop, Apr. 3-4, 2003, http://www.nfcrc.uci.edu/uffc/controlsworkshop/index.htm, 20 pages.

(Continued)

*Primary Examiner* — Michael Cuff
*Assistant Examiner* — Young Choi
(74) *Attorney, Agent, or Firm* — Perkins Coie LLP

(57) ABSTRACT

Fuel cell/combustor systems and methods for aircraft and other applications are disclosed. A system in accordance with one embodiment includes a fuel cell having an outlet positioned to remove output products from the fuel cell. The system can further include a fuel supply carrying a fuel having a different composition than the output products (e.g., aviation fuel), and a combustion chamber. The combustion chamber can in turn include a first inlet coupled to the outlet of the fuel cell to receive output products from the fuel cell, and a second inlet coupled to the fuel supply to receive the fuel. At least one combustion zone can be positioned in fluid communication with the first and second inlets to burn both the output products and the fuel.

24 Claims, 4 Drawing Sheets

OTHER PUBLICATIONS

Basu, S, "Heat Recovery System for a Hybrid SOFC Unit," research report/project, http://www.engr.uconn.edu/~sab03002/, spring 2003, 17 pages.

Basu, S, "High Pressure SOFC/Turbine System," research report/project, http://www.engr.uconn.edu/~sab03002/, spring 2003, 16 pages.

Mauss et al., "Diesel Reformers for Lean Nox Trap Regeneration and Other On-Board Hydrogen Applications," http://www.osti.gov/bridge/product.biblio.jsp?query_id+0&page=0&osti_id=829857, Aug. 24, 2003, 11 pages.

Ing. Zdenek Pors, "Power Cycles of High Temperature Fuel Cells," $3^{rd}$ ABA conference, Jun. 16-Jun. 20, 2002, Report #32, www.aba-brno.cz/aba2002, 10 pages.

Lagerström, G. et al, "High Performance & Cost Effective Recuperator for Micro-Gas Turbines," http://www.rekuperator.com/files/RSAB_recuperator_ASME-2002_paper.pdf, Technical Paper GT-2002-30402, ASME Turbo Expo Jun. 3-6, 2002, Amsterdam, Netherlands 7 pages.

Mesoscopic Devices, "75 W Portable SOFC Generator," Fuel Cell Seminar, Nov. 2004, http://www.mesoscopic.com/article_flat.fcm?subsite=9209&articleid=809, 28 pages.

Fuel Cell Handbook, Sixth Edition, DOE/NETL-2002/1179, U.S. Dept of Energy, Nov. 2002, Chapter 8, pp. 8-93 to 8-144.

SOFCo-EFS "Distillate Fuel Reformer Development for Fuel Cell Applications-Presentation," SOFCO Fuel Cell and Processor Solutions, 2005, 31 pages.

ZTEK Corporation, "Reshaping Energy Production with the Pure Power of Hydrogen," 2003 Brochure, http://www.ztekcorp.com/PDF/Brochure2003.pdf, 6 pages.

"Distributed Generation—Hybrids," Internet download, pp. 1-4, last updated May 24, 2005.

"Fuel Cell Off-Gas Combuster," Cambridge Combustion Research Centre, University of Cambridge, Department of Engineering, 2005, 2 pages, Internet download, Jun. 28, 2006.

"Fuel Reforming Catalytic Reactors," http://www.precision-combustion.com/reformerreactor.html, 2 pages, accessed Jun. 27, 2006.

Azom.com, "Solid Oxide Fuel Cells," http://www.azom.com/details.asp?ArticleID=919&head=Solid+Oxide+Fuel+Cells, 7 pages, Internet download, accessed Jun. 24, 2006.

Budge, J.R. et al., "Distillate Fuel Reformer Development for Fuel Cell Applications," 5th Annual Dept. of Defense Logistic Fuel Processsing Conference, Jan. 25-26, 2005, Panama City Beach, FL, 6 pages.

CFD Research Corporation, "Solid Oxide Fuel Cells," 2005, 2 pages, Internet download, Jun. 28, 2006.

European Commission, European Fuel Cell and Hydrogen Projects, 1999-2002, EUR 20718, 85 Pages.

Forbes, C. et al., "Demonstrations: The Bridge to Commercialization for the SOFC," http://www.electricity-today.com/et/june00/fuel2.htm, p. 1-3, accessed Jun. 27, 2006.

Freeh, J.E. et al., "Development of a Solid-Oxide Fuel Cell/Gas Turbine Hybrid System Model for Aerospace Applications," NASA/TM—2004-213054, GT2004-53616, May 2004, 16 pages.

Gorla, Rama S.R. et al., "Probabilistic Analysis of Solid Oxide Fuel Cell Based Hybrid Gas Turbine System," NASA/TM—2003-211995, GT-2003-38046, Apr. 2003, 12, pages.

Jansen, D. et al, "$CO_2$ Capture in SOFC-GT Systems," Second Annual Conference on Carbon Sequestration, May 5-8, 2003, Alexandria, Virginia, USA, p. 1-9.

Layne, A. et al., "Fuel Cell/Gase Turbine Hybrid Power Systems for Distributed Generation: A Status Report," ASME, International Gas Turbine Institute, http://igti.asme.org/resources/articles/hybrid1.html , 2 pages, accessed Jun. 28, 2006.

Lemanski, M. et al., "Analysis Strategies for Gas Turbine—Solid Oxide Fuel Cell Hybrid Cycles," Technical, Economic, and Environmental Aspects of Combined Cycle Power Plants, 2004, pp. 213-220, Gdansk TU Press.

NanoDynamics.com, "NanoDynamics Opens Solid Oxide Fuel Cell Laboratory," http://www.nanodynamics.com/Home/NDcorporateInfo/NDpressreleases/Apl21212003, 2 pages, Press Release, Apr. 2003.

NanoDynamics.com, "The Revolution in Portable Power Has Begun, Fuel Cell Power Without Hydrogen Fuel," ND Energy, http://www.nanodynamics.com/Home/StrategicBusinessUnits/NDEnergy, 2 pages, accessed Jun. 28, 2006.

Nguyen, M., "Solid Oxide Fuel Cell System Development," Honeywell, 2nd Solid State Energy Conversion Alliance Workshop, Mar. 29-30, 2001, Arlington, VA, 15 pages.

Pukrushpan, J.T. et al., "Control of Natural Gas Catalytic Partial Oxidation for Hydroen Generation in Fuel Cell Applications," IEEE Transaction on Control System Technology, draft document dated Mar. 26, 2003, pp. 1-24.

Samuelsen, S., "Fuel Cell/Gas Turbine Hybrid Systems," ASME International Gas Turbine Institute, 2004, 10 pages.

SECA, "Department of Energy Solid State Energy Conversion Alliance Program," Solid Oxide Fuel Cell-SOFC, 3 pages, accessed Jun. 28, 2006.

Siemens Westinghouse Power Corporation, "Tubular SOFC Hybrid Power Systems," Third DOE/UN International Conference and Workshop on Hybrid Power Systems, Newport Beach, CA, May 13, 2003, SPG SFC, 23 pages.

Siemens.com, "History-Tubular Solid Oxide Fuel Cell Technology," Siemens Power Generation: SOFC History, 2 pages, Internet download, accessed Jun. 21, 2006.

Siemens.com, "SOFC/Gas Turbine Hybrid," Power Generation: SOFC/GT Hybrid, 3 pages, Internet download, accessed Jun. 21, 2006.

Singhal, S.C., "Science and Technology of Solid-Oxide Fuel Cells," MRS Bulletin/Mar. 2000, pp. 16-21.

Williams, Dr. Mark C., "Overview DOE FE Fuel Cell Program," National Energy Technology Laboratory, PFCA Wahington, DC, 29 pages.

Williams, G.J. et al., "Design Optimisation of a Hybrid Solid Oxide Fuel Cell & Gas Turbine Power Generation System," ETSU F/01/00212/REP, DTI/Pub URN 01/1038, Contractor ALSTOM Power Technology Centre, First Published 2001, 227 pages.

* cited by examiner

FUEL CELL/COMBUSTOR SYSTEMS AND METHODS FOR AIRCRAFT AND OTHER APPLICATIONS

TECHNICAL FIELD

The present disclosure is directed to fuel cells/combustor systems and methods, which may be applied to aircraft and/or other devices or installations.

BACKGROUND

Aircraft manufacturers are under constant pressure to improve the fuel efficiency of modern commercial transport aircraft. Improved fuel efficiency can increase the range of the aircraft, reduce $CO_2$ emissions and/or reduce the cost of operating the aircraft. While modern, high-bypass turbofan engines have shown significant improvements in fuel efficiency when compared with the turbojet engines developed at the beginning of the jet age, aircraft manufacturers must continually strive to improve aircraft and aircraft engine performance in response to customer demands.

One relatively recent development in modern commercial aircraft includes replacing hydraulic and/or pneumatic aircraft actuators with electrically powered actuators. These actuators may be used to power a myriad of aircraft systems, including flaps, ailerons, and rudders. Electrically powered actuators use power provided by generators that are in turn driven by the aircraft turbofan engines (which also provide the main propulsive force for the aircraft). While this technology evolution has proven beneficial, it increases the power demands placed on aircraft engine generators, which typically requires an increase to the size of the generators. Furthermore, current aircraft engine generators are typically less than 45% efficient at converting Jet-A aviation fuel into electrical power during cruise operations. Accordingly, there is a strong desire to improve the efficiency with which electrical power is generated on board the aircraft, so as to keep the engine size as low as possible, reduce the amount of fuel carried aboard the aircraft, and/or improve the overall efficiency and environmental performance of the aircraft.

One approach to improving the efficiency with which electrical energy is generated onboard the aircraft is to use electrochemical fuel cells. For example, fuel cells have been identified as a replacement for the aircraft auxiliary power unit. However, fuel cells tend to be heavy, in many instances due to the peripheral equipment (e.g., compressors) used to provide air to the fuel cells for operation.

Another pressure that aircraft manufacturers face is reducing the emissions of potentially harmful gases present in the exhaust stream from the turbofan engines. Such emissions typically include $NO_x$ emissions, which can pollute the air near airports, and can lead to the formation of ozone at cruise altitudes. In response to pressures to reduce the emissions of such gases, low $NO_x$ combustors have been developed. These combustors typically operate at lower peak temperatures than more conventional combustors, by using a fuel-lean mixture, and by significantly increasing the degree to which the fuel is mixed with air before being combusted. However, a potential drawback with this arrangement is that the lean mixture may produce an unstable flame. As a result, the flame may be more likely to blow out ("flameout"), which can produce an unplanned unstart of the aircraft engine. One approach to addressing this drawback is to provide the combustor with a small fuel-rich spray at each nozzle. However, burning such a spray tends to produce the very emissions that the low $NO_x$ combustor is intended to reduce. In light of the foregoing, there is a desire to both improve the overall fuel efficiency and robustness of aircraft engines and reduce the emissions of potentially harmful exhaust products.

SUMMARY

The present summary is provided for the benefit of the reader only, and is not intended to limit in any way the scope of the invention as set forth by the claims. An aircraft power generation system in accordance with one aspect of the invention includes a fuel reformer that is coupleable to an aircraft fuel supply to receive aviation fuel. A fuel cell can be coupled to the reformer to receive reformed fuel (e.g., hydrogen and/or carbon monoxide). The fuel cell further includes an outlet positioned to remove output products from the fuel cell. The system can further include a combustion chamber that in turn includes a first inlet coupled to the outlet of the fuel cell to receive the output products from the fuel cell. A second inlet of the combustion chamber can be coupleable to the aircraft fuel supply to receive aviation fuel. The combustion chamber can further include at least one combustion zone coupled to the first and second inlets and positioned to burn both the output products and the aviation fuel. Accordingly, the fuel cell can provide electrical power for the aircraft, and the combustion chamber can provide propulsive power for the aircraft.

In particular aspects, the combustion zone includes a first combustion zone coupled to the first inlet and a second combustion zone coupled to the second inlet. The first combustion zone can be positioned to provide a pilot flame for combustion in the second combustion zone. Accordingly, the output products received from the fuel cell can be burned in a manner that stabilizes the flame for combustion of the aviation fuel.

In still a further aspect, the reformer is sized to provide to the fuel cell reformed fuel at a higher rate than the rate at which the fuel cell converts the reformed fuel to electrical energy. As a result, the output products can include unspent reformed fuel (e.g., hydrogen and/or carbon monoxide) which can burn readily in the combustion chamber to provide a stable flame.

In other aspects, the power generation system need not be installed on an aircraft. Accordingly, a power generation system in accordance with another aspect includes a fuel cell having an outlet positioned to remove output products from the fuel cell, a fuel supply carrying a fuel having a different composition than that of the output products, and a combustion chamber. The combustion chamber can in turn include a first inlet coupled to the output of the fuel cell to receive output products from the fuel cell, and a second inlet coupled to the fuel supply to receive the fuel. The combustion chamber can further include at least one combustion zone in fluid communication with the first and second inlets, the combustion zone being positioned to burn the output products and the fuel.

Still another aspect is directed to a method for generating power aboard an aircraft. For example, the method can include reforming a first portion of aviation fuel on board the aircraft to form a reformed fuel, and generating electrical power for the aircraft by passing the reformed fuel through a fuel cell. The method can further include removing unspent reformed fuel from the fuel cell, and generating propulsive power for the aircraft by combusting the unspent reformed fuel and a second portion of the aviation fuel in a combustion chamber. For example, combusting the unspent reformed fuel can include combusting the unspent reformed fuel in a pilot flame that is positioned to stabilize combustion of the second portion of the aviation fuel.

DETAILED DESCRIPTION

The present disclosure describes power generation systems and methods, including fuel cell/combustor systems and methods for aircraft and other applications. Certain specific details are set forth in the following description and in FIGS. 1-5 to provide a thorough understanding of various embodiments of the invention. Well-known structures, systems and methods often associated with such systems have not been shown or described in detail to avoid unnecessarily obscuring the description of the various embodiments of the invention. In addition, those of ordinary skill in the relevant art will understand that additional embodiments of the invention may be practiced without several of the details described below.

Figure 1:
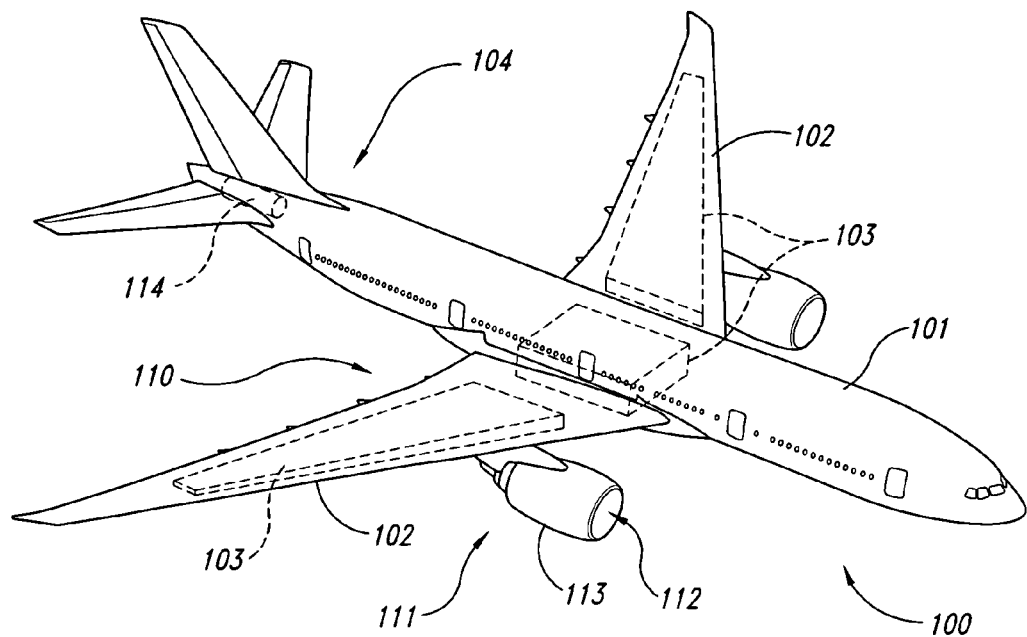
FIG. 1 is a partially schematic illustration of an aircraft having a power generation system configured in accordance with an embodiment of the invention.

FIG. 1 is a partially schematic illustration of an aircraft 100 that includes a power generation system 110 configured in accordance with an embodiment of the invention. The aircraft 100 can include a fuselage 101, wings 102 and multiple fuel tanks 103 that carry aviation fuel (e.g., Jet-A fuel). The fuel tanks 103 can be housed in the wings 102 and/or the fuselage 101. The power generation system 110 can include a propulsion system 111 as well as other power systems, for example, an auxiliary power unit (APU) 114 housed in an empennage 104 of the aircraft 100. The propulsion system 111 can include a turbofan engine 112 housed in a nacelle 113. In an embodiment shown in FIG. 1, the aircraft 100 includes two turbofan engines 112, each carried by one of the wings 102. In other embodiments, the aircraft 100 can include other engine arrangements.

Figure 2:
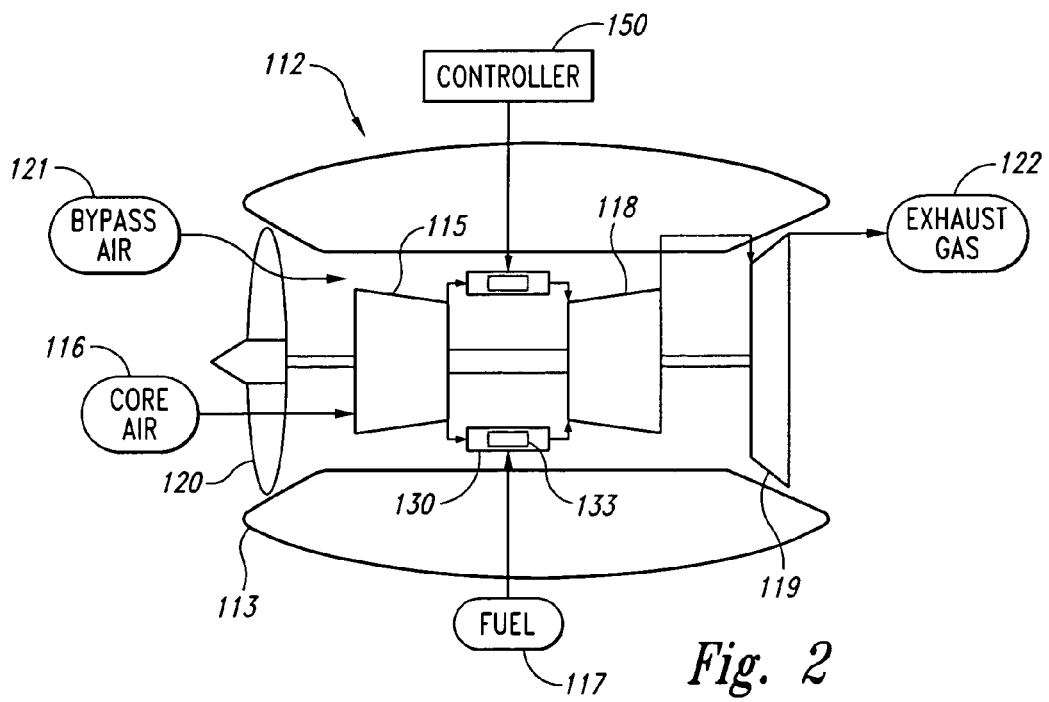
FIG. 2 is a partially schematic illustration of a turbofan engine suitable for powering an aircraft such as the one shown in FIG. 1.

FIG. 2 is a schematic illustration of an embodiment of the turbofan engine 112. The engine 112 includes a compressor 115 that receives core air 116 provided by an inlet in the nacelle 113. The compressor 115 pressurizes the core air 116 and provides it to a combustor 130. In the combustor 130, the compressed core air 116 is mixed with fuel 117 and burned. A fuel cell 133 can operate in conjunction with the combustion process in the combustor 130 to improve the overall performance of the turbofan engine 112, as will be discussed in greater detail later with reference to FIGS. 3-5.

The combustion products produced by the combustor 130 are provided to a high pressure turbine 118, which drives the compressor 115. The combustion products are then further expanded through a low pressure turbine 119 which drives a fan 120. The fan propels bypass air 121 around the core of the engine 112. The bypass air 121 mixes with exhaust gas 122 exiting the low pressure turbine 119 to provide forward thrust.

The operation of various components of the engine 112, in particular the delivery of fuel to the combustor 130 and the fuel cell 133 can be controlled by a controller 150. Accordingly, the controller 150 can include a computer and/or computer-readable medium containing instructions that direct the operation of the engine 112. The controller 150 therefore automates or at least partially automates many of the processes carried out by the engine 112.

Figure 3:
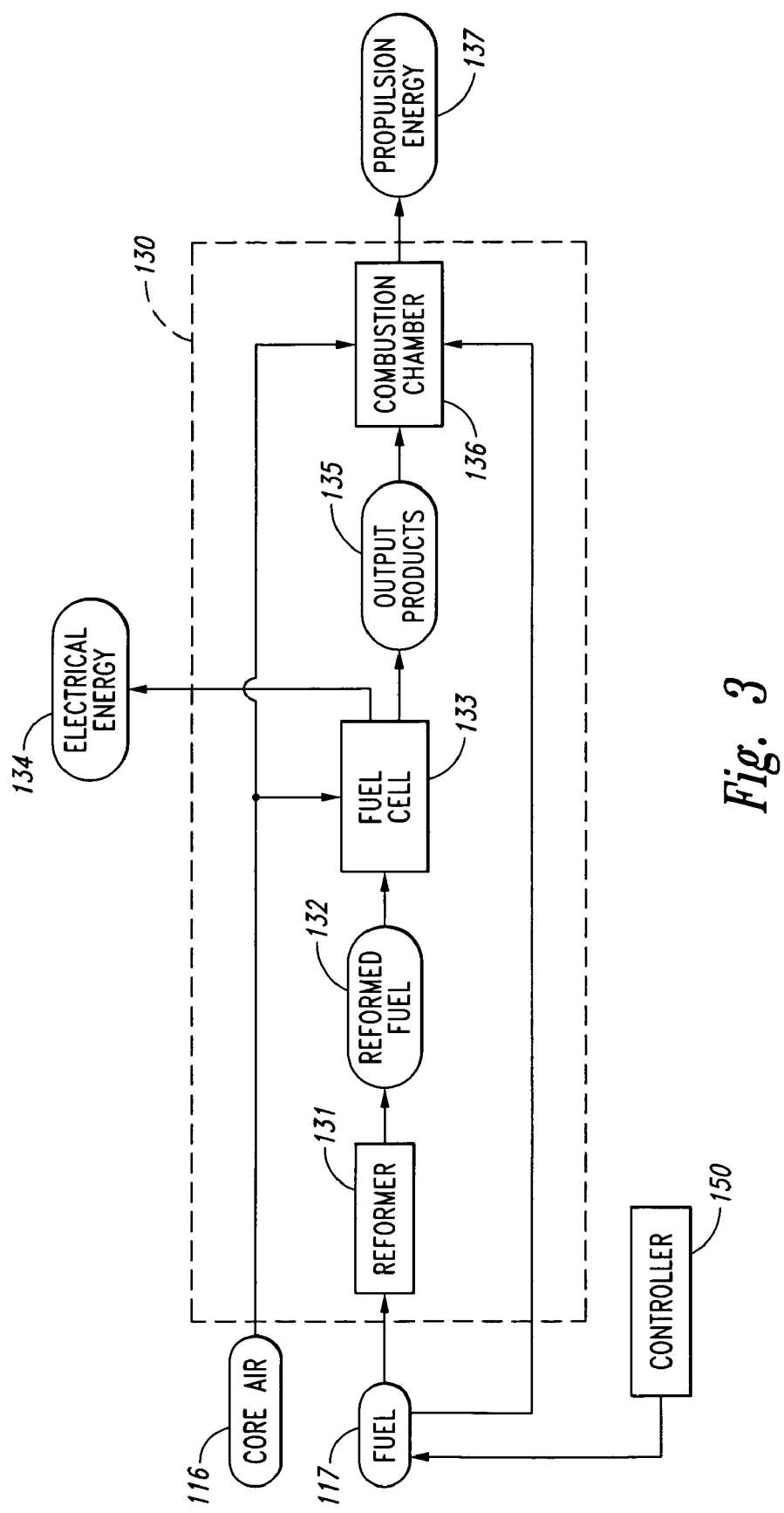
FIG. 3 is a schematic block diagram illustrating the production of energy in a portion of a power generation system in accordance with an embodiment of the invention.

FIG. 3 is a block diagram illustrating the processes carried out by the combustor 130 and the fuel cell 133 initially described above with reference to FIG. 2. As shown in FIG. 2, a portion of the fuel 117 carried aboard the aircraft is provided to a reformer 131. The reformer 131 can be configured to transform a hydrocarbon fuel (e.g., Jet-A aviation fuel) into a reformed fuel having constituents that are compatible with an electrochemical fuel cell. Such constituents can include hydrogen and/or carbon monoxide. The reformed fuel 132, along with a portion of the core air 116, is then provided to the fuel cell 133. An electrochemical reaction takes place in the fuel cell 133 to produce electrical energy 134 and output products 135.

In a particular embodiment, the fuel cell 133 includes a solid oxide fuel cell (SOFC) that produces high temperature output products 135, including unspent fuel (e.g., a portion of the reformed fuel 132). For example, the output products 135 may include hydrogen and carbon monoxide at a temperature of at least 800° C. In particular embodiments, the temperature of the output products 135 can be from about 800° C. to about 1,000° C. The output products 135 are provided to a combustion chamber 136, which also receives a portion of the fuel 117 and the core air 116. The fuel received in the combustion chamber 136, as well as the output products 135 received from the fuel cell 133, are burned in the combustion chamber 136 to produce propulsion energy 137. The propulsion energy 137 is harnessed through the turbines 118, 119 (FIG. 2) as well as via direct jet thrust. The electrical energy 134 produced by the fuel cell is used to power electrically driven components of the aircraft (e.g., environmental control systems and/or other systems).

Figure 4:
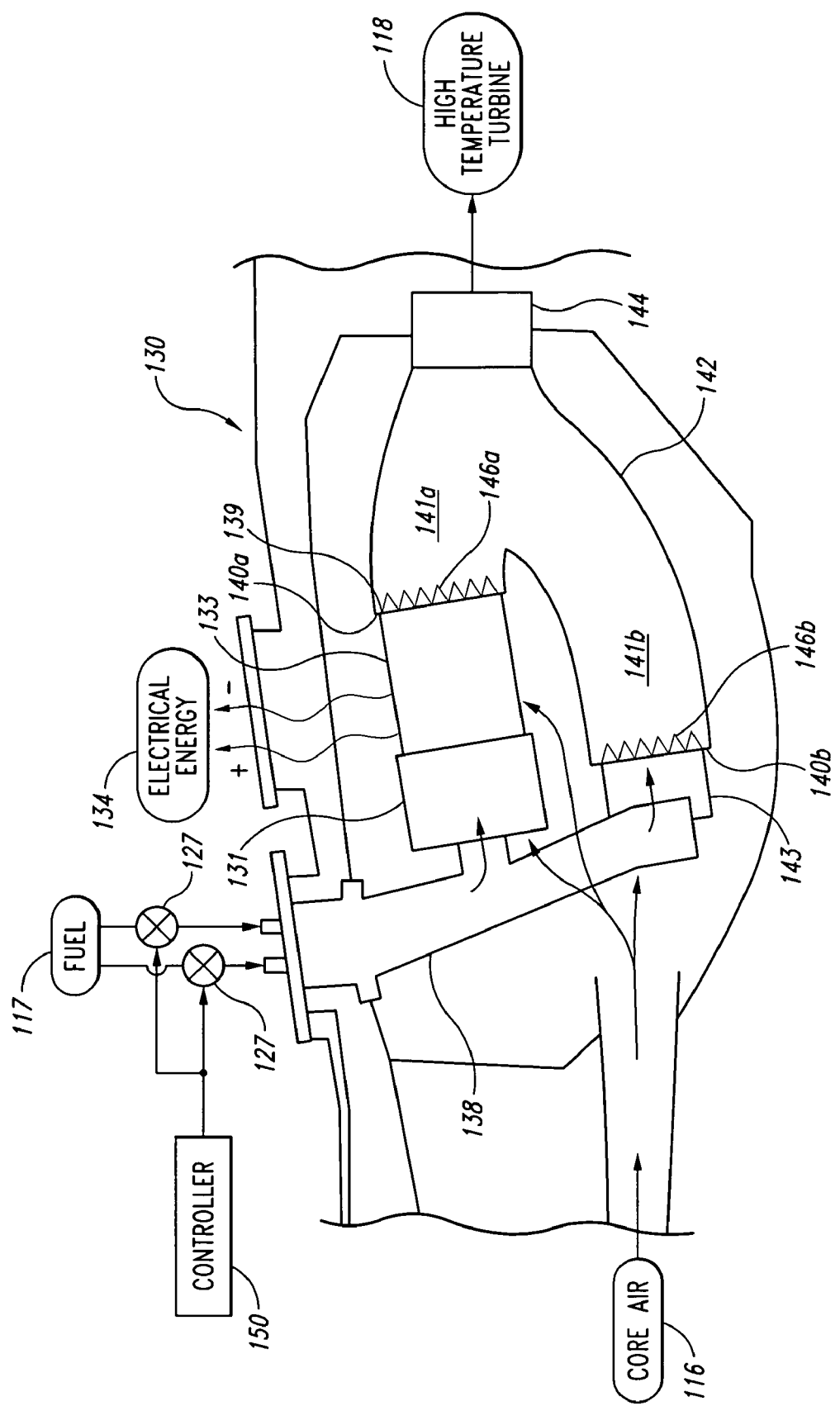
FIG. 4 is a partially schematic, cross-sectional illustration of a combustor that includes a fuel cell in accordance with an embodiment of the invention.

FIG. 4 is a partially schematic cross-sectional illustration of an embodiment of the combustor 130. In this particular embodiment, many of the components described above with reference to FIG. 3 are housed within the combustor 130 itself. In other embodiments, these components may be distributed outside the combustor 130, without affecting the overall function of the components. Housing at least some of these components within the combustor 130 provides for a compact arrangement that can reduce temperature and energy losses between the components.

The combustor 130 includes a fuel injector 138 that receives the fuel 117 and directs one portion of the fuel 117 into the fuel reformer 131, and directs another portion into a fuel/air premixer 143. The fuel 117 provided to the fuel reformer 131 and the premixer 143 can be metered by valves 127 under the direction of the controller 150. The fuel provided to the fuel reformer 131 is converted in the reformer 131 to a reformed fuel and is passed through the fuel cell 133 to produce the electrical energy 134. Core air 116 is also provided to the fuel reformer 131 and the fuel cell 133 to facilitate the reformation and energy generation processes, respectively. The output products from the fuel cell 133 exit at a fuel cell outlet 139 and are received in a first inlet 140a of a combustion chamber 142. The fuel cell outlet 139 and the first inlet 140a can be co-located so as to reduce or eliminate pressure and temperature losses between the fuel cell 133 and the combustion chamber 142. A first combustion zone 141a is positioned at the first inlet 140a, and can include an optional first flame holder 146a, shown schematically in FIG. 4. In other embodiments, the first flame holder 146a can be eliminated, and the fuel cell outlet 139 can operate as a flame holder. In either embodiment, output products received from the fuel cell 133 are burned in the first combustion zone 141a.

The combustion chamber 142 can further include a second inlet 140b that receives the fuel/air mixture from the fuel/air premixer 143. In a particular embodiment, the combustion chamber 142 can be a lean premix, prevaporized (LPP) low $NO_x$ combustion chamber that receives a fuel-lean mixture. An optional second flame holder 146b (shown schematically in FIG. 4) may be provided in a second combustion zone 141b. The first and second combustion zones 141a, 141b can have an annular arrangement, with the first combustion zone 140a positioned annularly outwardly from the second combustion zone 141b. Exhaust products from both combustion zones can be directed through turbine inlet guide vanes 144 to the high pressure turbine 118.

In a particular embodiment, the combustion process taking place in the first combustion zone 141a can stabilize the combustion process taking place in the second combustion zone 141b. For example, the output products received from the fuel cell 133 can include unspent reformed fuel including hydrogen. This hydrogen-rich gas tends to burn very well and stably under a wide range of combustor operating conditions. Accordingly, the burning output products can provide a pilot flame that stabilizes combustion of the un-reformed aviation fuel that is burned in the second combustion zone 141b. In a further particular aspect of this embodiment, the output products burned in the first combustion zone 141a are provided to the first combustion zone 141a at a temperature above the autoignition temperature of these products (e.g., in the range of from about 800° C. to about 1000° C. for a hydrogen-rich gas). Accordingly, when they mix with air or another oxygen source, they autoignite. This arrangement provides for additional robustness because the process does not rely on an igniter for sustained operation. Nevertheless, in some embodiments, an igniter may be used to initiate ignition if the output products are initially below the autoignition temperature, for example, during engine start-up.

The stable flame produced in the first combustion zone 141a can reduce or eliminate adverse impacts that may be created by a flameout in the second combustion zone 141b. In particular, because a fuel-lean mixture is burned in the second combustion zone 141b, the combustion process in this region may be susceptible to flameout. With the presence of the robust, stable flame provided by the combustion of the output products in the first combustion zone 141a, the likelihood for such flameouts can be reduced or eliminated.

In a particular aspect of an embodiment shown in FIG. 4, the controller 150 controls the interaction between the processes taking place in the first combustion zone 141a and the second combustion zone 141b. For example, the controller 150 can control the rate at which fuel is provided to the fuel reformer 131 and the fuel cell 133. By directing more fuel into the fuel reformer 131 and the fuel cell 133 than the fuel cell 133 can convert to electrical energy 134, the output products can be made to include a sufficient quantity of heated, but unburned or unspent reformed fuel. As discussed above, the heated, unspent reformed fuel can provide the basis for the combustion process in the first combustion zone 141a.

The controller 150 can also control the amount of fuel provided to the second combustion zone 141b. In a particular embodiment, the fuel provided to the second combustion zone 141b can be halted at all conditions other than engine idle. Accordingly, at engine idle, the only combustion process in the combustor 130 is the one that occurs in the first combustion zone 141a, with the flame provided there operating as a pilot flame. At thrust conditions above engine idle, fuel can be provided to the second combustion zone 141b and burned in a combustion process that is stabilized by the pilot flame in the first combustion zone 141a to produce the desired level of thrust.

Figure 5:
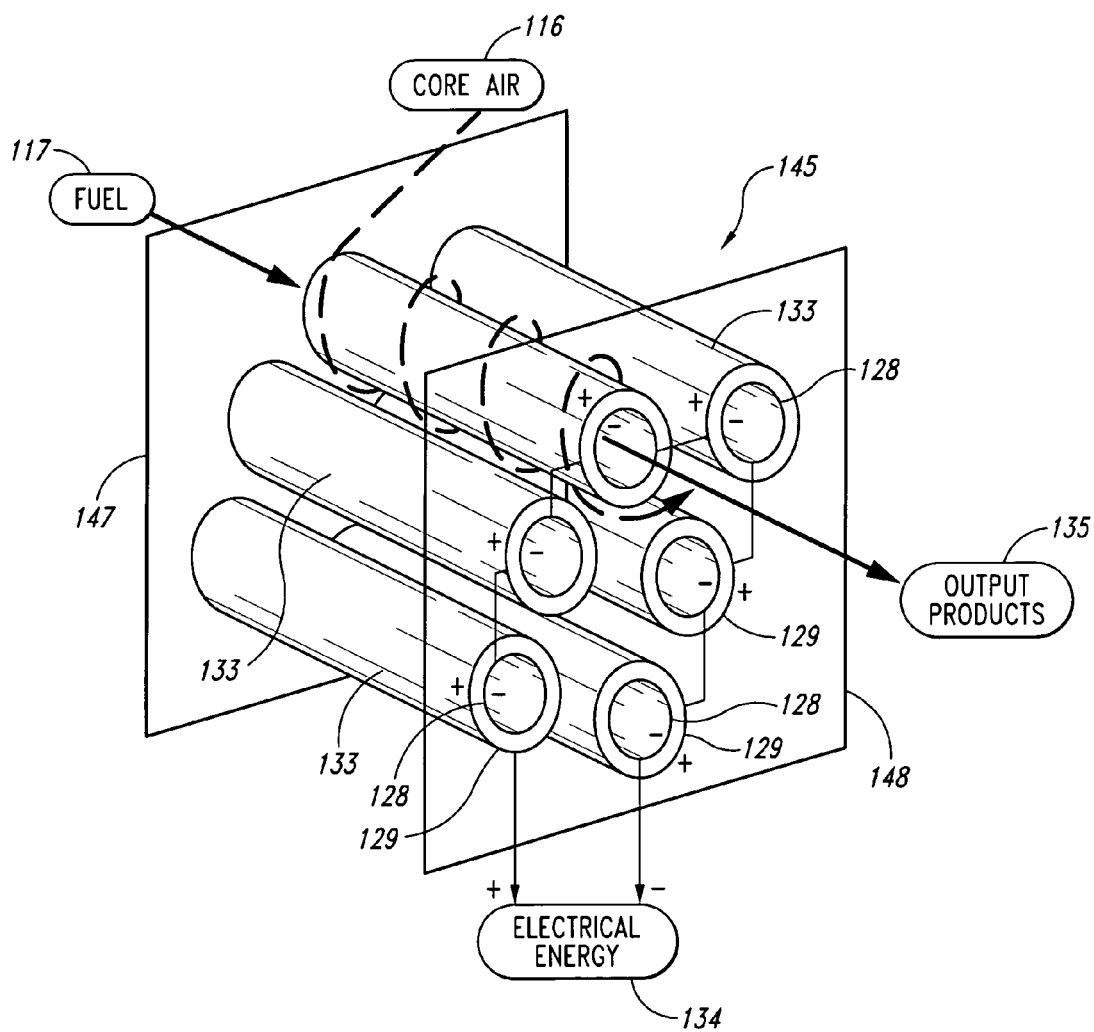
FIG. 5 is a partially schematic illustration of a fuel cell device that includes multiple fuel cells in accordance with an embodiment of the invention.

In some instances, the fuel cell 133 shown in FIGS. 3 and 4 can be a single fuel cell. In other arrangements, such as one shown in FIG. 5, a fuel cell device 145 includes a composite of individual fuel cells 133 that are connected together and arranged in a synergistic manner. Accordingly, the term fuel cell as used herein includes one or more fuel cells. The fuel cells 133 can include tubular, solid oxide fuel cells, prototypes of which have been developed by (and/or are in development by) Siemens of Berlin, Germany, Rolls Royce of Chantilly, Va., General Electric of Lynn, Mass., and NanoDynamics of Buffalo, N.Y. These fuel cells 133 have a hollow center through which the reformed fuel is passed, while oxygen (e.g., the core air 116) passes around the outside of the tube. A relatively low output voltage (e.g., 0.7 volts) is produced between an anode 129 and a cathode 128. Accordingly, multiple fuel cells 133 are coupled together to provide a useable electrical power output. As shown in FIG. 5, the individual fuel cells 133 can be coupled together in series to produce the output electrical energy 134. In a particular aspect, a sufficient number of fuel cells 133 can be provided in the fuel cell device 145 to produce many kilowatts (e.g., approximately 250 kW) of electrical power for each turbofan engine in which the device is incorporated. This level of power can be sufficient to eliminate the need for a separate electrical generator powered by the turbofan engine (although the engine may still include backup generators powered by the engine). In other embodiments, the power provided by the fuel cells 133 can be sufficient to eliminate the need for other power generators.

In another aspect of an arrangement shown in FIG. 5, the individual fuel cells 133 are arranged in parallel in a fluid dynamic sense, although they are connected in series in an electrical sense. Accordingly, fuel 117 can be provided to multiple fuel cells 133 at a common input manifold 147, and the output products 135 can be received at a common output manifold 148. The core air 116 can be circulated through the fuel cells 133 for use during the electrochemical process that produces the electrical energy 134.

One feature of several embodiments described above with reference to FIGS. 1-5 is that they include a combustor that burns two different types of fuel, e.g., the output products from a fuel cell, and the unreformed aviation fuel. During many phases of operation (e.g., at thrust settings above engine idle), both types of fuel are burned simultaneously. One advantage of this arrangement, as discussed above, is that the output products from the fuel cell can be burned in a way that provides a pilot flame or other stabilizing influence on the combustion process for the aviation fuel. This feature can be particularly important for lean premixed, prevaporized combustors, but can also have application to other combustion processes. In any of these applications, the more stable combustion processes provides for greater reliability of the engine.

Another feature of several of embodiments described above is that they include a fuel cell that is integrated into a turbofan engine. One advantage of the arrangement is that the fuel cell can readily use compressed air from the engine compressor, and can provide exhaust products to the engine turbine. As a result, the fuel cell need not have associated with it a separate compressor or turbine, which would add weight to the aircraft. Also, the air from the engine compressor is heated as a result of the compression process, which reduces or eliminates the need to have a separate heater or heat exchanger for the fuel cell 133.

Still another feature of several of the embodiments described above is that the fuel cell can be integrated with the turbofan engine in a manner that reduces the amount of redesign work necessary to support the configuration. For example, some existing combustor designs include a dual annular combustor arrangement. This arrangement can readily support the addition of the pilot flame combustion process described above.

Still another advantage of at least some of the foregoing features is that the energy produced by the fuel cell can replace one or more existing engine generator, and can provide electrical energy at a higher efficiency than that of an existing engine generator. Accordingly, several of the embodiments described above result in a power system having lower energy consumption, lower $NO_x$ emissions, and greater combustion stability than existing arrangements.

From the foregoing, it will be appreciated that specific embodiments of the invention have been described herein for purposes of illustration, but that various modifications may be made without deviating from the invention. For example, while aspects of the invention have been described in the context of aircraft turbofan engines, many of these aspects may also be implemented in other power generation devices. In particular examples, fuels other than aviation fuels (e.g., diesel fuel) and output products from a fuel cell may be burned in a combustor that is housed in an automobile, a truck, a land- or sea-based power generator, and/or other applications. The fuel cells can carry out electrochemical processes that produce useable output gases other than hydrogen and/or carbon monoxide. While solid oxide fuel cells are described above in the context of several embodiments, the fuel cells can be of other types in other embodiments. Aspects of the invention described in the context particular embodiments may be combined or eliminated in other embodiments. For example, the multiple fuel cell arrangement shown in FIG. 5 may be included in any of the systems shown in FIGS. 1-4. Further, while advantages associated with certain embodiments of the invention have been described in the context of those embodiments, other embodiments may also exhibit such advantages, and not all embodiments need necessarily exhibit such advantages to fall within the scope of the invention. Accordingly, the invention is not limited except as by the appended claims.

I claim:

1. An aircraft power generation system, comprising:
    a reformer coupled to an aircraft fuel supply to receive aviation fuel;
    a fuel cell coupled to the reformer to receive reformed fuel, the fuel cell having an outlet positioned to remove output products from the fuel cell; and
    a combustion chamber that includes:
        a first inlet coupled to the outlet of the fuel cell to receive the output products from the fuel cell;
        a second inlet coupled to the aircraft fuel supply to receive aviation fuel;
        at least one combustion zone coupled to the first and second inlets, the at least one combustion zone being positioned to burn the output products and the aviation fuel;
        wherein the combustion chamber is part of an airbreathing, turbofan engine configured to provide primary propulsive power to an aircraft; and
    a controller operatively coupled to the reformer, the fuel cell, and the combustion chamber, the controller having a computer readable medium containing instructions for performing a method comprising controlling an amount of fuel received by the reformer from the aircraft fuel supply such that the output products from the fuel cell includes a desired amount of unspent reformed fuel.

2. The system of claim 1, further comprising a controller operatively coupled to the engine, and wherein the controller is programmed with instructions to:
    provide the output products to the first inlet at engine settings including engine idle; and
    provide the aircraft fuel to the second inlet only at engine settings above engine idle.

3. The system of claim 1 wherein the turbofan engine includes a compressor, but does not include an engine generator driven by the compressor.

4. The system of claim 1 wherein the at least one combustion zone includes a first combustion zone coupled to the first inlet and a second combustion zone coupled to the second inlet, and wherein the first combustion zone is positioned in third communication with the second combustion zone to provide a pilot flame for combustion in the second combustion zone.

5. The system of claim 1 wherein the first combustion zone is positioned annularly outwardly from the second combustion zone.

6. The system of claim 1 wherein the combustion chamber includes a lean premix, prevaporized, low $NO_x$ combustion chamber.

7. The system of claim 1 wherein the fuel cell is coupled to an electrical device to power the electrical device, and wherein the system further comprises:
    an aircraft fuselage;
    a wing carried by the fuselage, the wing housing the aircraft fuel supply; and
    an engine housing the combustion chamber.

8. The system of claim 1 wherein the fuel cell is one of a plurality of solid oxide fuel cells, each having an electrical output terminal coupled to an electrical output terminal of another fuel cell.

9. The system of claim 1 wherein the reformer is configured to reform aviation fuel to hydrogen and carbon monoxide.

10. The system of claim 1 wherein the fuel cell is configured to emit the output products at a temperature of at least 800° C.

11. The system of claim 1 wherein the reformer is sized to provide to the fuel cell reformed fuel at a rate higher than a rate at which the fuel cell converts the reformed fuel to electrical energy.

12. The system of claim 1 wherein:
    the combustion chamber is part of an airbreathing, turbofan engine configured to provide primary propulsive power to an aircraft;
    the at least one combustion zone includes a first combustion zone coupled to the first inlet and a second combustion zone coupled to the second inlet, and wherein the first combustion zone is positioned to burn hydrogen and provide a pilot flame for combustion of Jet A fuel in the second combustion zone; and the controller is programmed with instructions to:
        provide the output products to the first inlet at engine settings including engine idle; and
        provide the aircraft fuel to the second inlet only at engine settings above engine idle.

13. The system of claim 1 wherein the outlet of the fuel cell is co-located with the first inlet of the combustion chamber.

14. A power generation system, comprising:
a fuel cell having an outlet positioned to remove output products from the fuel cell;
a fuel supply carrying a fuel having a different composition than the output products, the fuel supply being configured to provide a portion of the fuel to the fuel cell; and
a combustion chamber that includes:
  a first inlet coupled to the outlet of the fuel cell to receive output products from the fuel cell;
  a second inlet coupled to the fuel supply to receive the fuel; and
  at least one combustion zone in fluid communication with the first and second inlets, the at least one combustion zone being positioned to burn the output products and the fuel;
  wherein the combustion chamber is part of an airbreathing, turbofan engine configured to provide primary propulsive power to an aircraft; and
a controller operatively coupled to the fuel cell, fuel supply, and the combustion chamber, the controller having a computer readable medium containing instructions for performing a method comprising controlling the portion of the fuel provided to the fuel cell by the fuel supply such that the output products from the fuel cell includes a desired amount of unspent reformed fuel.

15. The system of claim 14 wherein the fuel supply carries aviation fuel or diesel fuel.

16. The system of claim 14 wherein controlling the portion of the fuel provided to the fuel cell includes directing more fuel into the fuel cell than an amount that the fuel cell is able to convert to electrical energy.

17. The system of claim 14 wherein the fuel supply includes an aircraft wing tank.

18. A method for generating power aboard an aircraft, comprising:
providing an aviation fuel comprising a first portion and a second portion;
reforming the first portion of aviation fuel onboard the aircraft to form a reformed fuel;
generating electrical power for the aircraft by passing the reformed fuel through a fuel cell;
removing unspent reformed fuel from the fuel cell; and
generating propulsive power for the aircraft by combusting the unspent reformed fuel and the unreformed second portion of the aviation fuel in a combustion chamber.

19. The method of claim 18 wherein combusting the unspent reformed fuel includes combusting reformed fuel, which has not been converted to electrical energy, in a pilot flame positioned to stabilize combustion of the second portion of the aviation fuel.

20. The method of claim 18 wherein removing unspent reformed fuel includes removing unspent reformed fuel at a temperature above an autoignition temperature of the aircraft fuel, and wherein the method further comprises providing the unspent reformed fuel to the combustor at a temperature above the autoignition temperature of the aircraft fuel.

21. The method of claim 18, further comprising providing reformed fuel to the fuel cell at a rate higher than a rate at which the fuel cell electrochemically converts reformed fuel to electrical energy.

22. The method of claim 18 wherein removing unspent reformed fuel from the fuel cell includes removing unspent reformed fuel having a temperature of at least 800° C.

23. The method of claim 18 wherein the aviation fuel includes Jet A fuel, and wherein reforming a first portion of the aviation fuel includes forming hydrogen and carbon monoxide.

24. The method of claim 18, further comprising providing air that is heated and compressed by a compressor of a turbofan engine to the fuel cell, and providing output products of the fuel cell to a turbine of the turbofan engine, via the combustion chamber.

* * * * *